United States Patent
Peña et al.

(10) Patent No.: US 11,973,237 B2
(45) Date of Patent: Apr. 30, 2024

(54) BATTERY PACK

(71) Applicant: MILWAUKEE ELECTRIC TOOL CORPORATION, Brookfield, WI (US)

(72) Inventors: Matthew J. Peña, Wauwatosa, WI (US); Cameron R. Schulz, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 529 days.

(21) Appl. No.: 17/183,492

(22) Filed: Feb. 24, 2021

(65) Prior Publication Data

US 2021/0265693 A1 Aug. 26, 2021

Related U.S. Application Data (60) Provisional application No. 62/981,175, filed on Feb. 25, 2020.

(51) Int. Cl.

| | | |
|---|---|---|
| *H01M 50/244* | (2021.01) | |
| *H01M 50/207* | (2021.01) | |
| *H01M 50/213* | (2021.01) | |
| *H01M 50/247* | (2021.01) | |

(Continued)

(52) U.S. Cl.
CPC ....... *H01M 50/244* (2021.01); *H01M 50/207* (2021.01); *H01M 50/247* (2021.01); *H01M 50/262* (2021.01); *H01M 50/267* (2021.01); *H01M 50/213* (2021.01); *H01M 2220/30* (2013.01)

(58) Field of Classification Search
CPC .................................................. H01M 50/267
See application file for complete search history.

(56) References Cited

U.S. PATENT DOCUMENTS

| | | |
|---|---|---|
| 4,253,232 A | 3/1981 | Bennett et al. |
| 4,431,717 A | 2/1984 | Kikuchi |
| 6,577,101 B1 | 6/2003 | Takeshita et al. |
| (Continued) | | |

FOREIGN PATENT DOCUMENTS

| | | |
|---|---|---|
| CN | 104979501 A | 10/2015 |
| CN | 205438462 U | 8/2016 |
| (Continued) | | |

OTHER PUBLICATIONS

Machine translation of CN 206274527U, Jun. 2017.*

(Continued)

*Primary Examiner* — Jonathan Crepeau
(74) *Attorney, Agent, or Firm* — Michael Best & Friedrich LLP (57) ABSTRACT

A battery pack is configured to be coupled to a power tool. The battery pack includes a housing having a cavity. The battery pack includes a battery cell carrier having first and second carriages. The first and second carriages support a plurality of battery cells therebetween. The battery cell carrier is configurable in different configurations based on a size of the plurality of battery cells supported between the first and second carriages. The battery pack includes a plurality of mounting features between the housing and the battery cell carrier. The plurality of mounting features is configured to alternatively secure the different configurations of the battery cell carrier to the housing.

20 Claims, 8 Drawing Sheets

(51) Int. Cl.
*H01M 50/262* (2021.01)
*H01M 50/267* (2021.01)

(56) References Cited

U.S. PATENT DOCUMENTS

| | | |
|---|---|---|
| 6,627,345 B1 | 9/2003 | Zemlok et al. |
| 6,819,081 B2 | 11/2004 | Izawa et al. |
| 7,622,219 B2 | 11/2009 | Ota et al. |
| 7,993,769 B2 | 8/2011 | Tsai et al. |
| 8,278,877 B2 | 10/2012 | Murayama et al. |
| 8,312,937 B2 | 11/2012 | Turner et al. |
| 8,624,552 B2 | 1/2014 | Murayama et al. |
| 8,741,461 B2 | 6/2014 | Yoneda et al. |
| 9,065,106 B2 | 6/2015 | Milbourne et al. |
| 9,263,717 B2 | 2/2016 | Nakano et al. |
| 9,368,842 B2 | 6/2016 | Johnson et al. |
| 9,502,699 B2 | 11/2016 | Murayama et al. |
| 9,673,429 B2 | 6/2017 | Cho |
| 9,705,116 B2 | 7/2017 | Milbourne et al. |
| 10,026,936 B2 | 7/2018 | Park et al. |
| 2015/0288038 A1 | 10/2015 | Johnson et al. |
| 2016/0235267 A1 | 8/2016 | Han et al. |
| 2017/0084892 A1 | 3/2017 | Lee et al. |
| 2017/0317322 A1 | 11/2017 | Milbourne et al. |
| 2019/0006652 A1 | 1/2019 | Kim |
| 2019/0148687 A1* | 5/2019 | Nishikawa .............. B25F 5/02 429/99 |
| 2019/0189982 A1 | 6/2019 | Lee et al. |
| 2019/0393627 A1 | 12/2019 | Etsunagi et al. |

FOREIGN PATENT DOCUMENTS

| | | | |
|---|---|---|---|
| CN | 206274527 U | | 6/2017 |
| CN | 207233816 U | | 4/2018 |
| CN | 108134017 A | | 6/2018 |
| CN | 209561509 U | | 10/2019 |
| JP | H097564 A | | 1/1997 |
| JP | 2001155702 A | | 6/2001 |
| JP | 2006099997 A | | 4/2006 |
| KR | 20180121265 A | * | 11/2018 |
| WO | 2012009281 A1 | | 1/2012 |
| WO | 2018221002 A1 | | 12/2018 |
| WO | 2019025876 A1 | | 2/2019 |

OTHER PUBLICATIONS

Machine translation of CN 104979501A, Oct. 2015.*
Chinese Patent Office Action for Application No. 202180020691.X dated Jan. 12, 2023 (7 pages including statement of relevance).
International Search Report and Written Opinion for Application No. PCT/US2021/019321 dated May 26, 2021 (10 pages).
Extended European Search Report for Application No. 21761397.5 dated Feb. 29, 2024 (11 pages).

* cited by examiner

BATTERY PACK

CROSS-REFERENCE TO RELATED APPLICATIONS

This application claims the benefit of U.S. Provisional Patent No. 62/981,175 filed on Feb. 25, 2020, the contents of which are incorporated herein by reference.

FIELD OF THE DISCLOSURE

The present disclosure relates to a battery pack, and more particularly to a battery cell carrier coupled to a housing of the battery pack.

SUMMARY

In one aspect, a battery pack is configured to be coupled to a power tool. The battery pack includes a battery cell carrier having first and second carriages. The first and second carriages are configured to be spaced a first distance relative to each other to support a plurality of first battery cells therebetween. The first and second carriages are configured to be spaced a second distance relative to each other to support a plurality of second battery cells therebetween. The battery pack includes a housing having a cavity. The cavity is configured to receive the battery cell carrier when the first and second carriages are spaced at the first distance. The cavity is configured to receive the battery cell carrier when the first and second carriages are spaced at the second distance. The battery pack includes a plurality of mounting posts coupled to one of the housing and the battery cell carrier, and a plurality of mounting apertures formed in the other one of the housing and the battery cell carrier. The plurality of mounting apertures is configured to enable the first and second carriages to be secured to the housing when the first and second carriages are spaced at the first distance. The plurality of mounting apertures is configured to enable the first and second carriages to be secured to the housing when the first and second carriages are spaced at the second distance.

In another aspect, a battery pack is configured to be coupled to a power tool. The battery pack includes a housing having a cavity. The battery pack includes a battery cell carrier having first and second carriages. The first and second carriages support a plurality of battery cells therebetween. The battery cell carrier is configurable in different configurations based on a size of the plurality of battery cells supported between the first and second carriages. The battery pack includes a plurality of mounting features between the housing and the battery cell carrier. The plurality of mounting features is configured to alternatively secure the different configurations of the battery cell carrier to the housing.

In yet another aspect, a method of manufacturing a battery pack. The battery pack is configured to be coupled to a power tool. The method includes providing a housing including a cavity and providing a first battery cell carrier including a plurality of first battery cells. Each battery cell of the plurality of first battery cells includes a first length. The first battery cell carrier is configured to be coupled to the housing. The method includes providing a second battery cell carrier including a plurality of second battery cells. Each battery cell of the plurality of second battery cells includes a second length different than the first length. The second battery cell carrier is configured to be coupled to the housing. The method includes selecting the first battery cell carrier or the second battery cell carrier to be coupled to the housing and securing the selected battery cell carrier to the housing.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
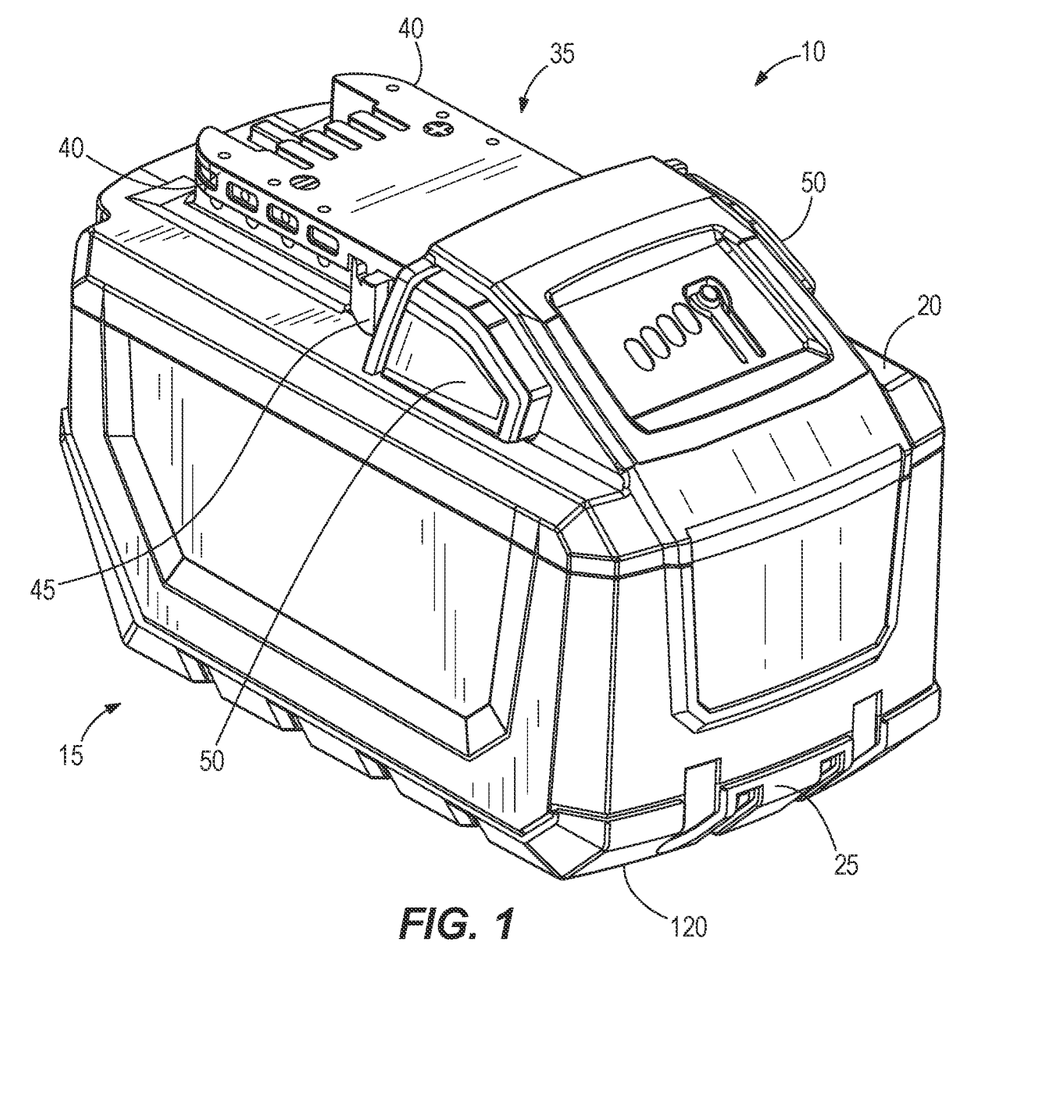
FIG. 1 is a top perspective view of a battery pack.
Figure 2:
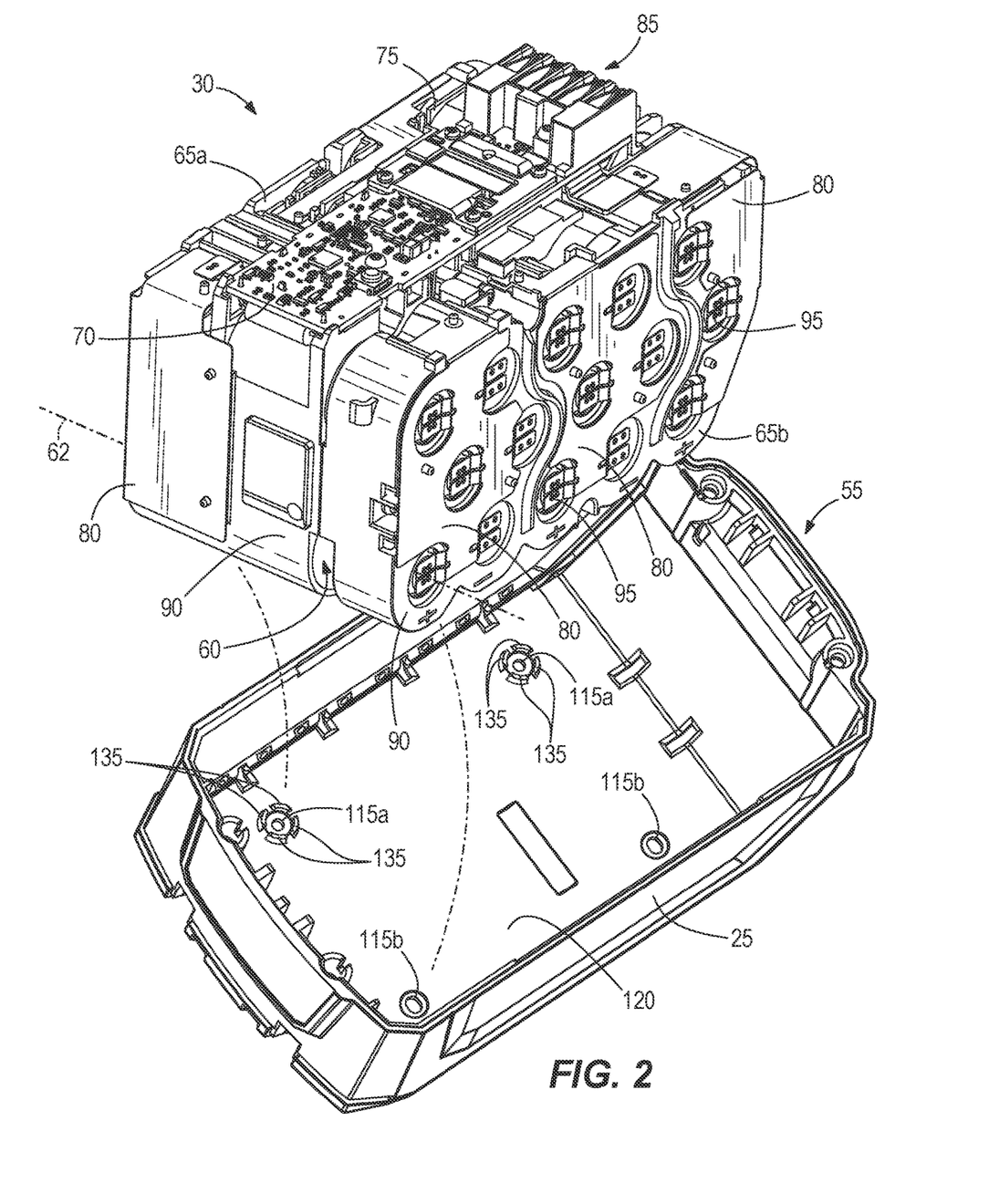
FIG. 2 is a partial exploded view of the battery pack of FIG. 1 illustrating a battery cell carrier received within a lower housing portion of the battery pack.

FIG. 1 illustrates a battery pack 10 including an outer housing 15 having an upper housing portion 20 and a lower housing portion 25. The battery pack 10 also includes a battery cell carrier 30 (e.g., a battery cell core; FIG. 2) coupled to the outer housing 15 between the upper housing portion 20 and the lower housing portion 25. The upper housing portion 20 includes connection features 35 that are operable to selectively couple the battery pack 10 to a power tool (e.g., a drill, a reciprocating saw, a grinder, etc.). For example, the connection features 35 include rails 40 that are sized to slidably interface with the power tool and at least one latch 45 that holds the battery pack 10 to the power tool. At least one release actuator 50 is coupled to the upper housing portion 20 and is operable to move the latch 45 to detach the battery pack 10 from the power tool. In other embodiments, the battery pack 10 can be coupled to a different implement (e.g., portable lighting, lawn care equipment such as lawn mowers, chainsaws, blowers, etc.). In further embodiments, the battery pack 10 can be configured as a stem-style battery pack.

With reference to FIG. 2, the battery cell carrier 30 is received within a cavity 55 of the lower housing portion 25 for the lower housing portion 25 to support the battery cell carrier 30. The battery cell carrier 30 includes battery cells 60 (e.g., cylindrical-shaped battery cells) supported between two carriages 65a, 65b. Each battery cell 60 includes a longitudinal axis 62. The battery cell carrier 30 also includes a circuit board 70 coupled to a top surface 75 (e.g., top side) of the two carriages 65a, 65b and is in electrical communication with cell connectors 80 and a power tool connector 85. The illustrated cell connectors 80 are coupled to lateral sides 90 of the carriages 65a, 65b and include contacts 95 that extend through openings formed through the two carriages 65a, 65b to engage ends of the battery cells 60. The illustrated power tool connector 85 is also coupled to the top surface 75 of the two carriages 65a, 65b and provides electrical communication between the battery cell carrier 30 and the power tool when the battery pack 10 is coupled to the power tool.

Figure 3:
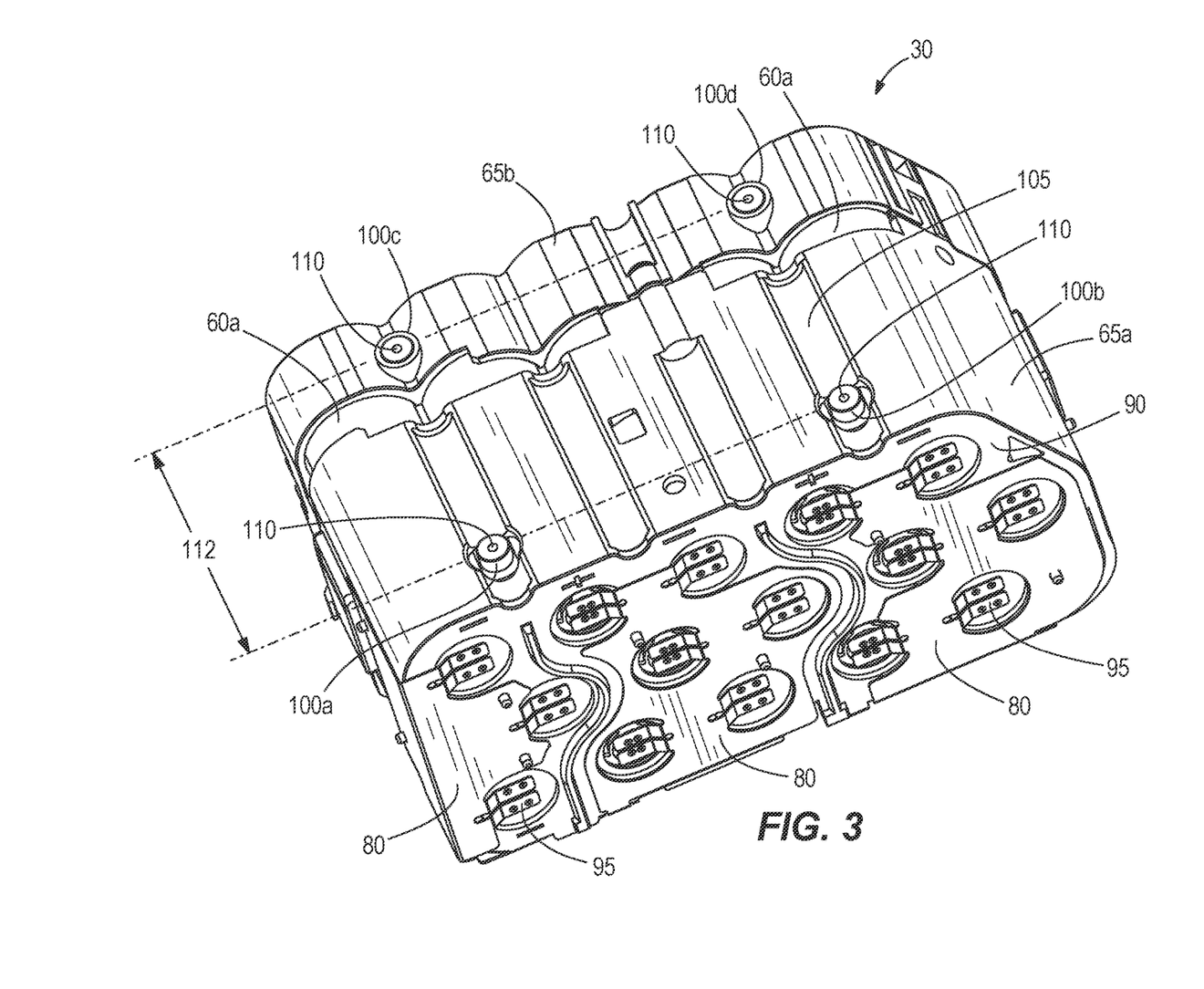
FIG. 3 is a bottom perspective view of the battery cell carrier of FIG. 2 in a first configuration.
Figure 4:
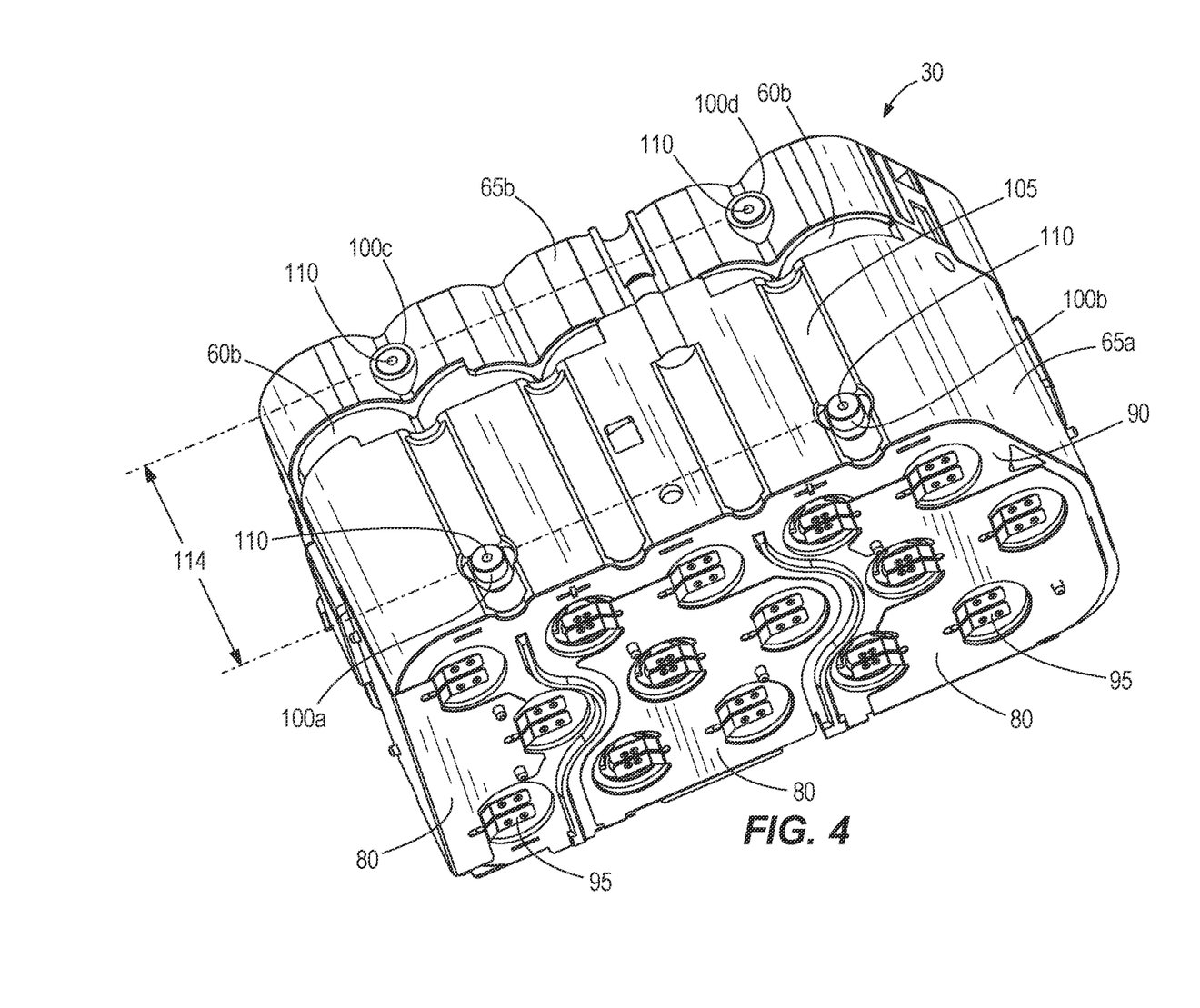
FIG. 4 is a bottom perspective view of the battery cell carrier of FIG. 2 in a second configuration.

As shown in FIGS. 3 and 4, the carriages 65a, 65b include posts 100 (e.g., bases) extending from a bottom surface 105 (e.g., bottom side) of the carriages 65a, 65b. In the illustrated embodiment, the first carriage 65a includes two posts 100a, 100b, and the second carriage 65b includes two posts 100c, 100d. Each post 100 on the first carriage 65a is associated with one post 100 positioned on the second carriage 65b in a lateral direction (e.g., parallel to the longitudinal axes 62 of the battery cells 60). For example, the first post 100a is associated with the third post 100c, and the second post 100b is associated with the fourth post 100d. Each post 100 includes a post aperture 110. In some embodiments, the post apertures 110 can be threaded apertures. In other embodiments, the carriages 65a, 65b can include a total of one, two, three, etc. posts 100. In further embodiments, the posts 100 can be located on a different portion of the carriages 65a, 65b (e.g., at least one post 100 can be positioned on a lateral side 90, the top surface 75, etc.).

With continued reference to FIGS. 3 and 4, the illustrated battery cell carrier 30 can support different sized battery cells 60a, 60b between the carriages 65a, 65b. For example, in a first configuration shown in FIG. 3, the battery cell carrier 30 can support longer battery cells 60a, and in a second configuration shown in FIG. 4, the battery cell carrier 30 can support shorter battery cells 60b. Accordingly, the first configuration of the battery cell carrier 30 includes a first lateral distance 112 (FIG. 3) that is greater than a second lateral distance 114 (FIG. 4) of the second configuration due to the longer battery cells 60a. In other words, the size of the battery cell carrier 30 (e.g., the lateral width) is larger when supporting the longer battery cells 60a than when supporting the shorter battery cells 60b. The first and second lateral distances 112, 114 can be measured between the post aperture 110 of the first post 100a and the post aperture 110 of the third post 100c, or the first and second lateral distances 112, 114 can be measured between the post aperture 110 of the second post 100b and the post aperture 110 of the fourth post 100d. In other embodiments, the first and second lateral distances 112, 114 can be measured between opposing sides 90 of the first and second carriages 65a, 65b in a direction parallel to the longitudinal axes 62 of the battery cells 60. In the illustrated embodiment, the first lateral distance 112 is about 0.32 millimeters (mm) greater than the second lateral distance 114. In other words, the battery cells 60a are about 0.32 mm longer than the battery cells 60b. In other embodiments, the first lateral distance 112 can be between about 0.2 mm and about 0.5 mm greater than the second lateral distance 114. In further embodiments, the first lateral distance 112 can be between about 0.5 mm and about 2 mm greater than the second lateral distance 114. In yet further embodiments, the first lateral distance 112 can be any distance such that the battery cell carrier 30 can be received within the cavity 55 of the lower housing portion 25. In still further embodiments, the battery cells 60a, 60b can differ in other dimensions (e.g., a diameter, a cross-section, etc.) to change the footprint or size of the carrier 30 in the first configuration relative to the carrier 30 in the second configuration.

In the illustrated embodiment, the first configuration of the battery cell carrier 30 including the longer battery cells 60a has a total capacity (e.g., amp-hour capacity) that is greater than when the battery cell carrier 30 includes the shorter battery cells 60b. For example, each battery cell 60a includes about a 5 amp-hour (Ah) capacity that provides a total of about 15 Ah capacity when the battery cell carrier 30 is in the first configuration. Each battery cell 60b includes about a 4 Ah capacity that provides a total of about 12 Ah capacity when the battery cell carrier 30 is in the second configuration. In other embodiments, the total capacity of the first and second configurations can be different (e.g., anywhere between 1 Ah and 25 Ah). In addition, the illustrated battery cell carrier 30 in either the first or second configurations includes a nominal voltage of about 18 volts. In other embodiments, the nominal voltage of the battery cell carrier 30 can be greater or less than 18 volts (e.g., 12 volts, 40 volts, etc.).

Figure 5:
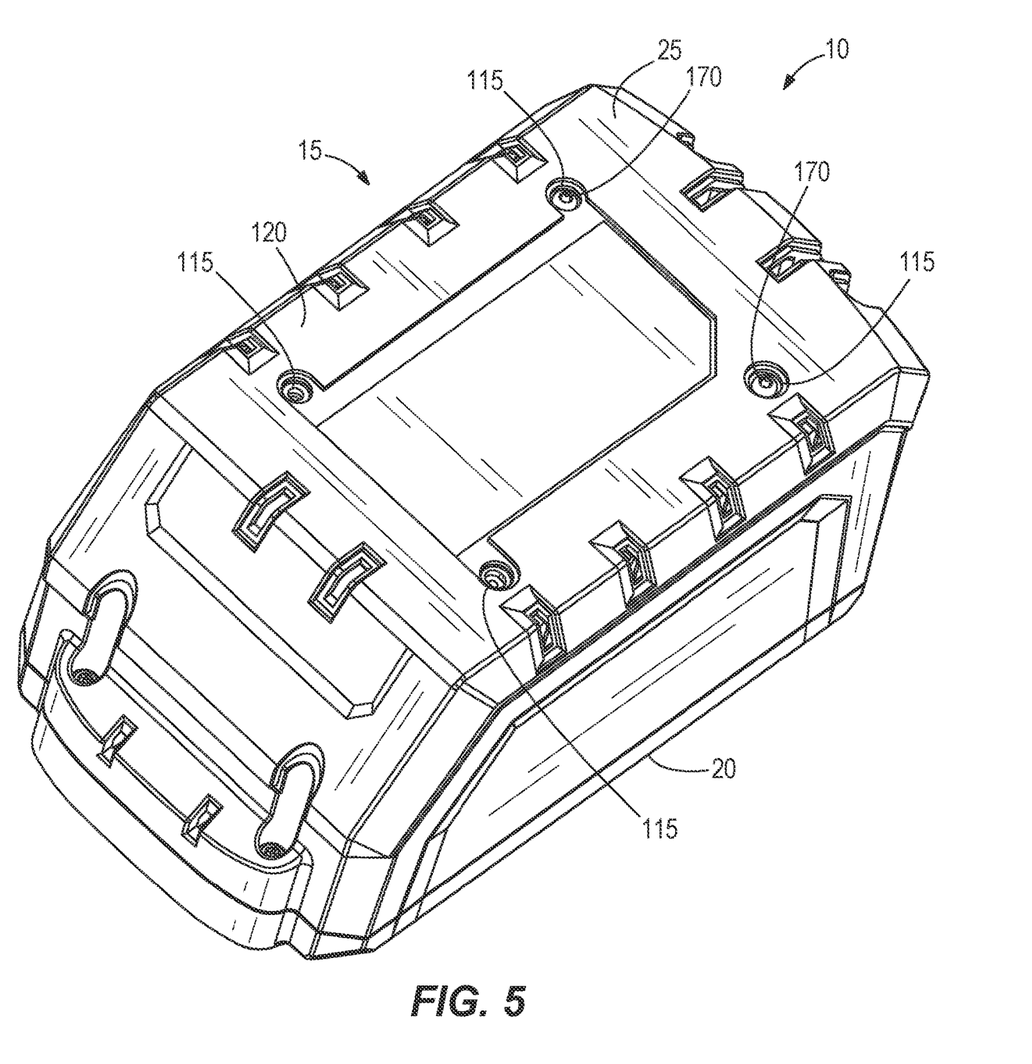
FIG. 5 is a bottom perspective view of the battery pack of FIG. 1.
Figure 6:
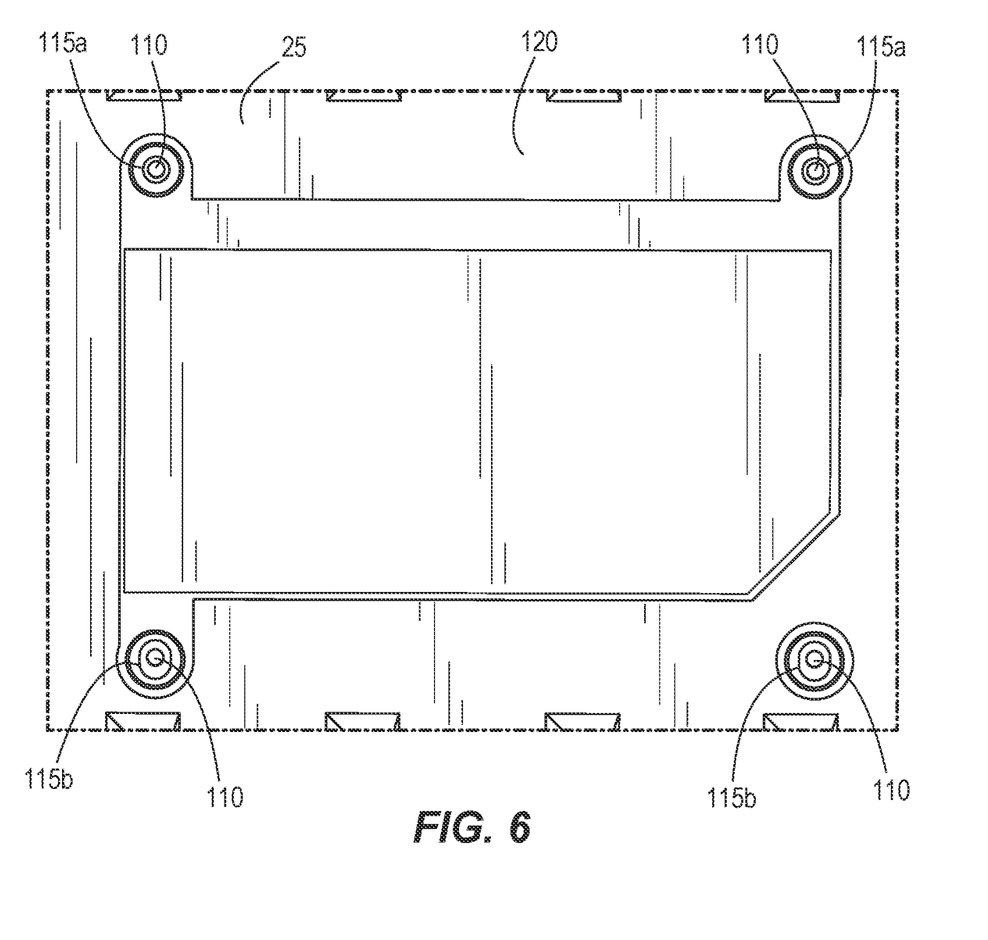
FIG. 6 is a bottom view of the battery pack of FIG. 1 illustrating mounting apertures of the lower housing portion providing access to the battery cell carrier for fasteners to couple the battery cell carrier to the lower housing portion.
Figure 7:
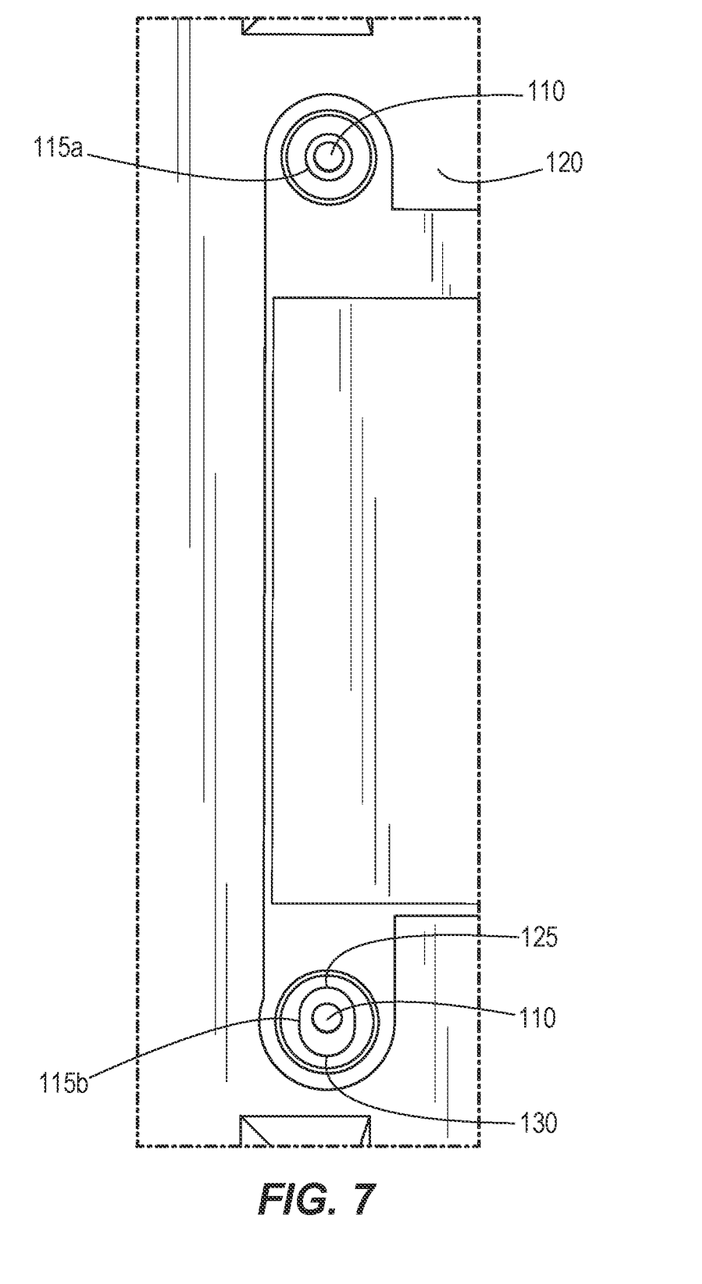
FIG. 7 is a detailed view of two mounting apertures of FIG. 6.

With reference to FIGS. 2 and 5, the lower housing portion 25 includes mounting apertures 115 formed through a bottom wall 120 of the lower housing portion 25, which is opposite the top housing portion 20. In the illustrated embodiment, the mounting apertures 115 are differently shaped. For example, as best shown in FIGS. 6 and 7, a pair of first mounting apertures 115a are circular, and a pair of second mounting apertures 115b are noncircular (e.g., oblong). As best shown in FIG. 7, each noncircular mounting aperture 115b includes an inboard side 125 and an outboard side 130. The inboard side 125 is positioned closer to the corresponding first mounting aperture 115a than the outboard side 130.

In some embodiments, all of the mounting apertures 115 can be noncircular. In other embodiments, the noncircular shape of the second mounting apertures 115b can be in a shape of a rectangle, triangle, etc. In other embodiments, the second mounting apertures 115b can be larger sized circular apertures than the first mounting apertures 115a. In further embodiments, the mounting apertures 115 can be located on a different portion of the lower housing portion 25 (e.g., at least one mounting aperture 115 can be positioned on a side wall of the lower housing portion 25), and/or the mounting apertures 115 can be formed through the upper housing portion 20. In yet further embodiments, the mounting apertures 115 can be formed on the carriages 65a, 65b, and the posts 100 can be coupled to the outer housing 15.

In addition, with reference back to FIG. 2, the lower housing portion 25 includes a plurality of protrusions 135 extending from the bottom wall 120 around each mounting aperture 115a. In the illustrated embodiment, four protrusions 135 surround each mounting aperture 115a. In some embodiments, the protrusions 135 can be rigid and/or can include more or less than four protrusions. In other embodiments, the protrusions 135 can be resiliently biased protrusions.

During assembly, the illustrated outer housing 15 is sized to support the battery cell carrier 30 in the first configuration (FIG. 3) to provide a higher output battery pack (e.g., 15 Ah)

or the second configuration (FIG. 4) to provide a lower output battery pack (e.g., 12 Ah). Accordingly, the utility of the outer housing 15 is increased as the outer housing 15 can be used to support different configurations of the battery cell carrier 30 than a housing that can only support one specific battery cell carrier. For example, different battery cell carrier platforms (e.g., 12 Ah, 15 Ah, etc. platforms) can utilize the same outer housing 15, thereby reducing manufacturing costs associated with producing distinct outer housings for each platform.

Figure 8:
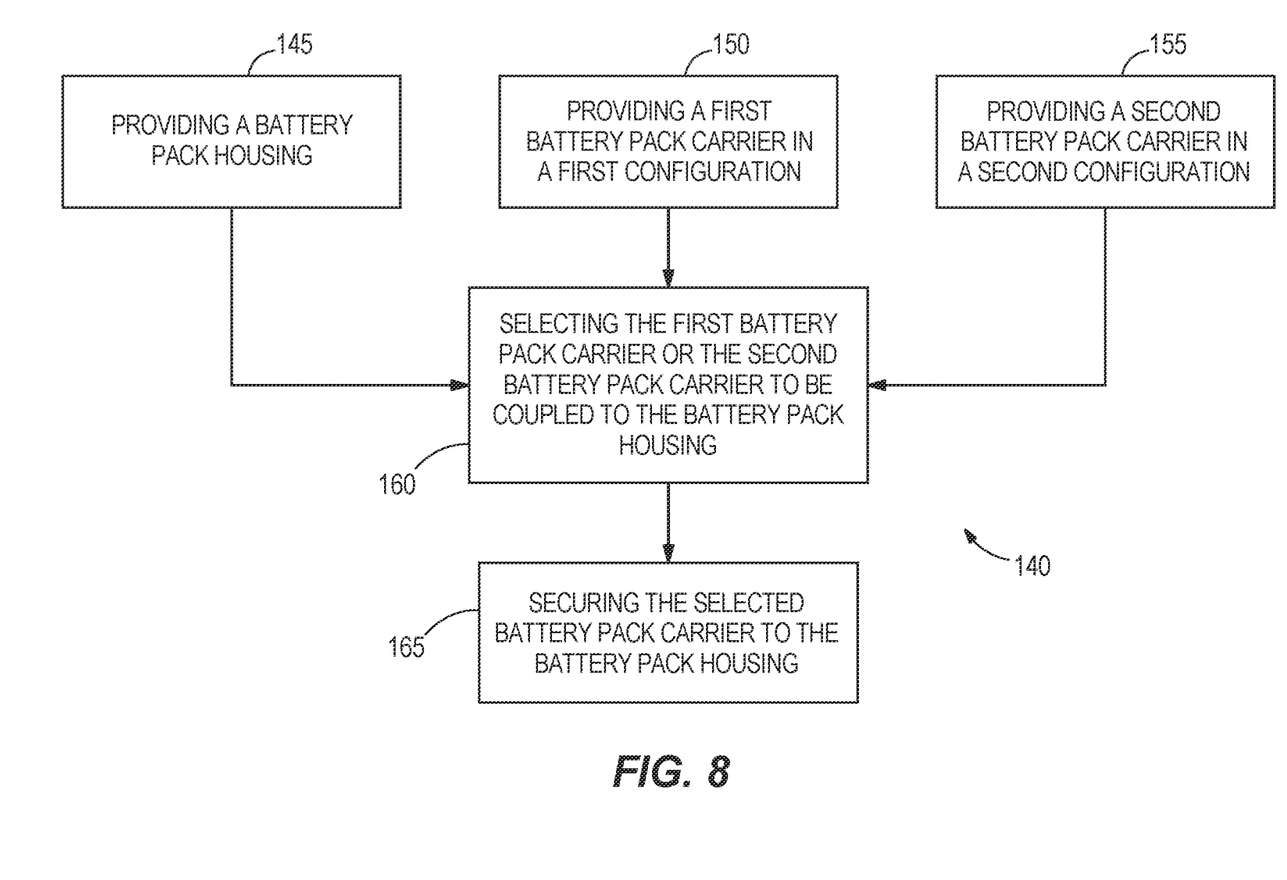
FIG. 8 is a flowchart illustrating a method of manufacturing the battery pack of FIG. 1 including either the battery cell carrier of FIG. 3 in the first configuration or the battery cell carrier of FIG. 4 in the second configuration.

In particular, FIG. 8 illustrates a method 140 of manufacturing the battery pack 10. Step 145 includes providing the lower housing portion 25, step 150 includes providing a first battery cell carrier 30 in the first configuration (FIG. 3), and step 155 includes providing a second battery cell carrier 30 in the second configuration (FIG. 4). In some embodiments, the battery pack 10 can be assembled on an assembly line such that an assembler can select the first battery cell carrier 30 in the first configuration or the second battery cell carrier 30 in the second configuration to be coupled to the lower housing portion 25 (step 160). For example, if the assembler desires to manufacture a higher output battery pack 10 (e.g., 15 Ah battery pack), the assembler selects the first battery cell carrier 30 in the first configuration to be coupled to the lower housing portion 25. Alternatively, if the assembler desires to manufacture a lower output battery pack 10 (e.g., 12 Ah battery pack), the assembler selects the second battery cell carrier 30 in the second configuration to be coupled to the lower housing portion 25. In other embodiments, the first battery cell carrier 30 can be selected for a first assembly line to be assembled with a lower housing portion 25, and the second battery cell carrier 30 can be selected for a second assembly line to be assembled with a lower housing portion 25.

The selected first or second battery cell carrier 30 is then secured to the lower housing portion 25 (step 165). In particular, if the selected battery cell carrier 30 is the first battery cell carrier 30 in the first configuration, the first battery cell carrier 30 is inserted into the cavity 55 of the lower housing portion 25 such that the posts 100 align with the mounting apertures 115. For example, the posts 100a, 100b are aligned with the mounting apertures 115a for each post 100a, 100b to engage the corresponding four protrusions 135. Engagement between the protrusions 135 and the posts 100a, 100b locates the post apertures 110 of the other posts 100c, 100d with the corresponding mounting apertures 115b. In other words, the posts 100a, 100b and the protrusions 135 are alignment features between the battery cell carrier 30 and the lower housing portion 25. Thereafter, fasteners 170 (e.g., screws or the like; FIG. 5) are inserted through the mounting apertures 115 to engage the posts 100 to fixedly couple the first battery cell carrier 30 in the first configuration to the lower housing portion 25. Accordingly, the posts 100, the mounting apertures 115, the protrusions 135, and the fasteners 170 can be considered as mounting features to align and secure the battery cell carrier 30 to the lower housing portion 25.

Alternatively, if the selected battery cell carrier 30 is the second battery cell carrier 30 in the second configuration, the second battery cell carrier 30 is inserted into the cavity 55 of the lower housing portion 25 such that the posts 100a, 100b engage the protrusions 135 in a similar manner as described above. In other words, the first battery cell carrier 30 and the second battery cell carrier 30 are coupled to the lower housing portion 25 in a mutually exclusive relationship. As the first and second lateral distances 112, 114 of the two configurations of the battery cell carriers 30 are different, the noncircular apertures 115b provide enough clearance for the fasteners 170 to extend through the lower housing portion 25 and engage the posts 100 when in the second configuration. For example, the fasteners 170 will be positioned closer to the inboard sides 125 of the noncircular apertures 115b when the second battery cell carrier 30 is secured to the lower housing portion 25 than when the first battery cell carrier 30 is secured to the lower housing portion 25.

In the illustrated embodiment, engagement between the protrusions 135 and the posts 100a, 100b temporarily hold and locate the battery cell carrier 30 relative to the lower housing portion 25. In other embodiments, the engagement between the protrusions 135 and the posts 100a, 100b can fixedly couple the battery cell carrier 30 to the lower housing portion 25 (e.g., a snap fit connection). In further embodiments, the protrusions 135 can also extend around the noncircular apertures 115b to engage the posts 100c, 100d.

Once the selected battery cell carrier 30 is secured to the lower housing portion 25, the remaining portions of the battery pack 10 are assembled (e.g., securing the upper housing portion 20 to the lower housing portion 25, etc.). In other embodiments, the battery pack 10 can be assembled in different steps. For example, the lower housing portion 25 can be provided, the battery cell carrier 30 can be assembled to be in either the first or second configurations, and then the assembled battery cell carrier 30 can be secured to the lower housing portion 25.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A battery pack configured to be coupled to a power tool, the battery pack comprising:
   a battery cell carrier including first and second carriages, the first and second carriages configured to be spaced a first distance relative to each other to support a plurality of first battery cells therebetween, the first and second carriages configured to be spaced a second distance relative to each other to support a plurality of second battery cells therebetween;
   a housing including a cavity, the cavity configured to receive the battery cell carrier when the first and second carriages are spaced at the first distance, the cavity configured to receive the battery cell carrier when the first and second carriages are spaced at the second distance;
   a plurality of mounting posts coupled to one of the housing and the battery cell carrier; and
   a plurality of mounting apertures formed in the other one of the housing and the battery cell carrier,
   wherein the plurality of mounting apertures is configured to enable the first and second carriages to be secured to the housing when the first and second carriages are spaced at the first distance, wherein the plurality of mounting apertures is configured to enable the first and second carriages to be secured to the housing when the first and second carriages are spaced at the second distance.

2. The battery pack of claim 1, wherein the plurality of mounting apertures is formed in the housing, and wherein a first mounting aperture of the plurality of mounting apertures is shaped differently than a second mounting aperture of the plurality of mounting apertures.

3. The battery pack of claim 2, wherein the first mounting aperture is circular and the second mounting aperture is noncircular.

4. The battery pack of claim 3, wherein the housing includes a plurality of protrusions spaced around the first mounting aperture, and wherein the plurality of protrusions engage a first mounting post of the plurality of mounting posts to position the plurality of mounting posts relative to the plurality of mounting apertures.

5. The battery pack of claim 1, wherein the first and second carriages are configured to support the plurality of first battery cells with each battery cell of the plurality of first battery cells including a first length, and wherein the first and second carriages are configured to support the plurality of second battery cells with each battery cell of the plurality of second battery cells including a second length shorter than the first length.

6. The battery pack of claim 1, further comprising a plurality of fasteners securing the battery cell carrier to the housing via the plurality of mounting posts and the plurality of mounting apertures.

7. The battery pack of claim 6, wherein the plurality of fasteners are screws.

8. A battery pack configured to be coupled to a power tool, the battery pack comprising:
    a housing including a cavity;
    a battery cell carrier including first and second carriages, the first and second carriages supporting a plurality of battery cells therebetween, the battery cell carrier configurable in different configurations based on a size of the plurality of battery cells supported between the first and second carriages; and
    a plurality of mounting features between the housing and the battery cell carrier, the plurality of mounting features configured to alternatively secure the different configurations of the battery cell carrier to the housing.

9. The battery pack of claim 8, wherein the plurality of mounting features include a plurality of mounting posts and a plurality of mounting apertures.

10. The battery pack of claim 9, wherein a first mounting aperture of the plurality of mounting apertures is shaped differently than a second mounting aperture of the plurality of mounting apertures.

11. The battery pack of claim 10, wherein the first mounting aperture is circular and the second mounting aperture is noncircular.

12. The battery pack of claim 10, wherein the plurality of mounting features include a plurality of protrusions spaced around at least one of the plurality of mounting apertures, and wherein the plurality of protrusions engage a first mounting post of the plurality of mounting posts to position the plurality of mounting posts relative to the plurality of mounting apertures.

13. The battery pack of claim 12, wherein the plurality of mounting posts is coupled to the battery cell carrier, wherein the plurality of mounting apertures is formed in the housing, and wherein the plurality of protrusions is coupled to the housing.

14. The battery pack of claim 8, wherein the battery cell carrier is configurable in the different configurations based on a length of the plurality of battery cells supported between the first and second carriages.

15. The battery pack of claim 9, wherein the plurality of mounting features include a plurality of fasteners securing the battery cell carrier to the housing via the plurality of mounting posts and the plurality of mounting apertures.

16. The battery pack of claim 15, wherein the plurality of fasteners are screws.

17. A method of manufacturing a battery pack, the battery pack configured to be coupled to a power tool, the method comprising:
    providing a housing including a cavity;
    providing a first battery cell carrier including a plurality of first battery cells, each battery cell of the plurality of first battery cells including a first length, the first battery cell carrier configured to be coupled to the housing;
    providing a second battery cell carrier including a plurality of second battery cells, each battery cell of the plurality of second battery cells including a second length different than the first length, the second battery cell carrier configured to be coupled to the housing;
    selecting the first battery cell carrier or the second battery cell carrier to be coupled to the housing; and
    securing the selected battery cell carrier to the housing.

18. The method of claim 17, further comprising aligning a plurality of mounting features between the selected battery cell carrier and the housing, wherein the plurality of mounting features include a plurality of mounting posts and a plurality of mounting apertures, wherein the plurality of mounting posts is coupled to one of the selected battery cell carrier and the housing, and wherein the plurality of mounting apertures is formed in the other one of the selected battery cell carrier and the housing.

19. The method of claim 18, wherein securing the selected battery cell carrier to the housing includes coupling a plurality of fasteners between the plurality of mounting apertures and the plurality of mounting posts.

20. The method of claim 19, wherein the plurality of mounting apertures is formed in the housing, and wherein the plurality of mounting posts is coupled to the selected battery cell carrier.

* * * * *